United States Patent [19]

Cucuzza

[11] Patent Number: 4,566,699
[45] Date of Patent: Jan. 28, 1986

[54] FLYING APPARATUS AND METHOD

[75] Inventor: Joseph R. Cucuzza, Bellevue, Wash.

[73] Assignee: Richards Aerospace Research Corporation, Burnsville, Minn.

[21] Appl. No.: 453,241

[22] Filed: Dec. 27, 1982

[51] Int. Cl.[4] .............................................. B64C 39/06
[52] U.S. Cl. .................................. 244/12.2; 244/23 C; 244/207; 244/73 B
[58] Field of Search .................... 244/12.1, 12.2, 12.3, 244/23 R, 23 C, 23 B, 52, 207, 208, 100 R, 75 R, 118.5, 73 R, 73 B, 73 C

[56] References Cited

U.S. PATENT DOCUMENTS

| | | | |
|---|---|---|---|
| 2,376,834 | 5/1945 | Thompson | 244/12.1 |
| 2,585,676 | 2/1952 | Poisson-Quintan | 244/208 |
| 2,737,874 | 3/1956 | Gallay et al. | 244/118.5 |
| 2,890,843 | 6/1959 | Affinello | 244/208 |
| 3,051,413 | 8/1962 | Pouit | 244/207 |
| 3,065,935 | 11/1962 | Dubbury et al. | 244/23 C |
| 3,072,366 | 1/1963 | Freeland | 244/23 C |
| 3,432,120 | 3/1969 | Guerrero | 244/12.2 |
| 3,451,645 | 6/1969 | Wolcott | 244/12.1 |

Primary Examiner—Galen L. Barefoot
Attorney, Agent, or Firm—Merchant, Gould, Smith, Edell, Welter & Schmidt

[57] ABSTRACT

A novel and improved heavier-than-air flying craft (20) is the subject matter of this patent application. The craft (20) includes an airfoil (22), over an upper wall (28) of which multiple fluid streams are directed. The craft (20) can include a multiplicity of main engines (54) for directing the fluid streams. Vertical ascent and horizontal translational flight can be controlled by modulating the flow of exhaust from these engines (54). The craft (20) can further include auxiliary engines (58) for facilitating horizontal translational flight and yaw control engines (56) to augment yawing of the craft (20). None of the engines (54, 56, 58) have moving parts, and the airfoil (22) has no moving parts in the external air stream.

27 Claims, 10 Drawing Figures

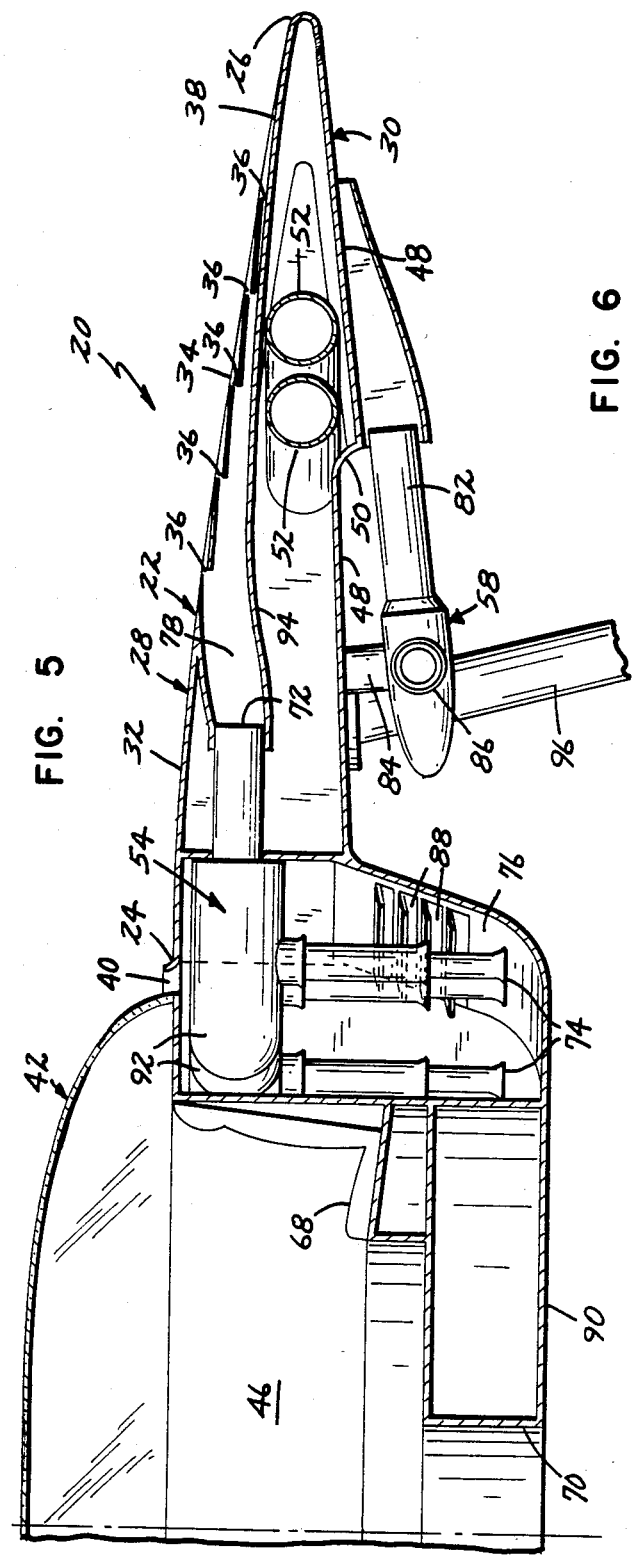
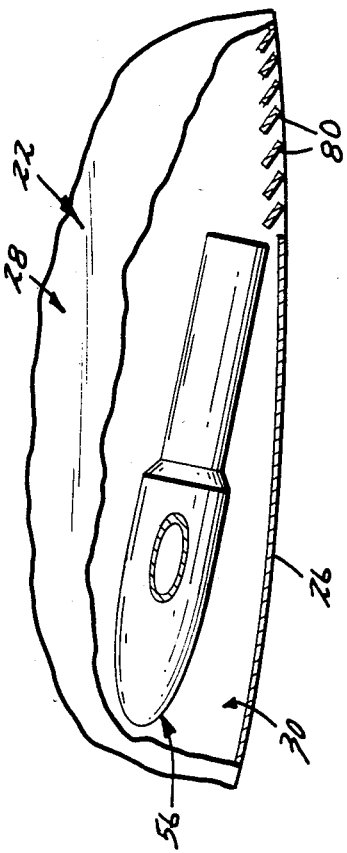

FLYING APPARATUS AND METHOD

TECHNICAL FIELD

The invention of this patent application relates to flying vehicles. Broadly, it deals with a heavier than air structure used for flight. More specifically, however, it deals with structures and a method for accomplishing heavier-than-air flight with ease and safety. A preferred embodiment of the invention deals with structural relationships of the various elements of an airfoil of the flying apparatus to effect flight in a new manner.

BACKGROUND OF THE INVENTION

Since time immemorial, man has sought to design and build the optimum flying machine. Reduction of moving parts is part of such optimization. During the Middle Ages, various inventors designed apparatus which they felt would achieve the objective of enabling man to fly. It has, however, only been within the last 100 years that significant progress has been made toward developing viable aircraft.

Basically, flying craft can be divided into one of two types: lighter-than-air devices and heavier-than-air devices. Developments came earlier with regard to the former type of craft. Such a vehicle is provided with a bladder or balloon which can be filled with a gas having a specific gravity less than that of air. This type of craft is an application of Archimedes' principle which states that a body immersed in a fluid is bouyed up by a force equal to the weight of the liquid it displaces. If the weight of the fluid displaced is greater than the weight of the body, the body will "float" on the fluid. Zeppelins and hot air balloon recreational craft are illustrative of this type of vehicle.

Heavier-than-air craft, on the other hand, function because of either Newton's third law of motion or Bernoulli's principle, or both. Newton's third law of motion states that, for every action, there is an equal and opposite reaction. A helicopter is a heavier-than-air craft illustrating the application of this law. As the main rotor of a helicopter rotates, the pitch of the blades will cause the exertion of a force upon the air through which the rotor cuts. As a consequence, an equal and opposite force will be exerted upon the rotor blades as they rotate. This force will, in view of the pitch of the rotor blades and the direction in which the rotor rotates, urge the helicopter upwardly.

A conventional fixed wing aircraft illustrates the application of Bernoulli's principle in combination with Newton's third law of motion. The principle states that, as a fluid is caused to be moved over a surface, the pressure upon the surface will be reduced below ambient pressure. In the case of the fixed wing aircraft, the curvature of the upper surface of an airfoil, or wing, is such that the distance which air that is attacked by a forward edge of the airfoil travels in passing above the foil is greater than that travelled by air passing below the foil. In order to meet and merge properly with air at the rear edge of the foil, therefore, the air passing above the airfoil will travel at a greater velocity than that passing beneath. Consequently, the pressure exerted upon the upper surface will be less than that exerted upon the lower surface of the foil. This differential in pressures creates the lift necessary to cause the airplane to fly.

Heretofore, helicopters have had distinct advantages over craft which rely upon Bernoulli's principle for take off and flight. Because of the principles upon which they rely for operation, they are able to both take off and land vertically. Consequently, they can operate from launching sites of a relatively small size.

Both helicopters and fixed wing aircraft, however, have certain limitations which decrease efficiency, convenience, and safety of operation of the craft. Illustrative of these limitations is the large number of moving parts involved with both types of these craft. Most importantly, such a limitation can allow for the possibility of the occurrence of accidents because of failure of one or more of the parts. Even when adequate maintenance is conducted in order to minimize the chances of accident occurrence, significant man hours must be expended in conducting the maintenance, and component replacement can be very expensive.

Typically, aircraft of the type previously discussed utilize "air breathing" engines. Consequently, the efficiency of their operation tends to diminish as the altitudes at which the craft are operated are increased. This is due to the rarified air conditions at these increased altitudes.

The propulsion means employed by these types of craft have other disadvantages. In addition to being less efficient in operation at greater altitudes, they tend to be ecologically polluting. Fuels which engines powering conventional aircraft burn vent noxious pollutants into the atmosphere.

It is to these deficiencies in the prior art that the invention of the present application is directed. It provides a heavier-than-air craft which overcomes these problems to provide a desirable alternative to the various types of conventional aircraft presently used.

SUMMARY OF THE INVENTION

The invention of the present application is a flying craft which includes an airfoil and a novel method of flight. The airfoil has an upper surface over which multiple streams of high velocity fluid are directed. Such a craft can accomplish vertical lift and propelled flight without the presence of moving control surfaces in the air stream or moving parts in means which generate and direct the fluid streams.

The airfoil can have radially inward and outward peripheral edges and a generally flattened profile as it extends from its inward edge to its outward edge. An upper wall of the airfoil can have a portion (preferably annular in shape) with a multiplicity of radially outwardly venting apertures formed therein. The portion is radially intermediate the inward edge and the outward edge. The high velocity fluid streams can be directed through these apertures and over the upper surface of the upper wall of the airfoil in order to create lift and, when modulated, movement of the craft horizontally through the air during a powered flight mode.

In a preferred embodiment, as viewed in plan, the airfoil is circular in shape. It will be understood, however, that this structuring is not essential to the invention. With a circular airfoil, a plurality of propane burning engines can be used to create and direct fluid flow over the upper surface of the airfoil. It has been found that proper lift characteristics can be achieved by utilizing 20 equi-angularly spaced engines directing fluid flow outwardly through louvers which can function as the apertures and over the upper surface of the airfoil. With structuring of this nature, adjacent engines are spaced from one another at approximately 18°.

Volume of exhaust flow from the engines can be made to be uniform in order to lift the apparatus off the ground in a generally vertical direction. Once it has achieved a desired altitude, engines spaced forwardly with respect to an intended direction of motion of the craft can be throttled back, and the craft will progressively move forward. As the craft achieves increased velocity, air will pass in a reverse direction through the louvers communicating with the engines which have been throttled back and into the engines themselves. Each of the 20 engines, when that number is utilized, can have an air intake in a common chamber. When the forwardly disposed engines are turned off and air is passing through the louvers with which they communicate, these engines act as ram air ducts to force air into the common chamber and into the air intakes of the operating engines.

Additional engines (e.g., four) of a construction similar to the 20 engines previously discussed can be used to augment flight of the craft in the intended direction of forward movement. These auxiliary engines can be secured to the bottom side of the airfoil immediately beneath the four rearmost of the main lift engines. These four auxiliary engines can be symmetrically disposed on either side of a fore-aft axis of the craft. Although these engines extend generally radially, the largest component of their thrust vector will be exerted to move the craft in a forwardly direction.

Two additional engines can be utilized to facilitate yaw control. One can be disposed at either lateral edge of a circular airfoil. Exhaust can be directed in opposite circumferential directions in order to provide yaw control to either the left or the right. As in the case of the lift generation engines, both the forward flight augmentation and yaw control engines can be devoid of moving parts.

In the preferred embodiment, the airfoil can be annular and can have a cabin supported by the airfoil within the central aperture formed therein. The cabin can provide accommodations for operators of the craft, passengers, and cargo.

The craft can further include means for supporting its weight when it is on the ground. The support means can include a plurality of downwardly extending struts. The struts can carry means for ascertaining the weight distribution on the craft and the location of the center of gravity thereof. The craft can further include means for redistributing the weight to insure the balance of the craft during flight.

The invention of the present application is, thus, an improved heavier-than-air craft and a method of flight which solve many of the problems known in the prior art and very efficiently accomplishes the designed goals of the structure. More specific features and advantages obtained in view of those features will become apparent with reference to the detailed description of the invention, appended claims, and drawing figures.

BRIEF DESCRIPTION OF THE DRAWINGS

FIG. 5 is an enlarged side sectional view of a portion of the cabin and airfoil;

FIG. 6 is an enlarged fragmentary plan view illustrating a yawing motion control engine;

DETAILED DESCRIPTION OF THE INVENTION

Figure 1:
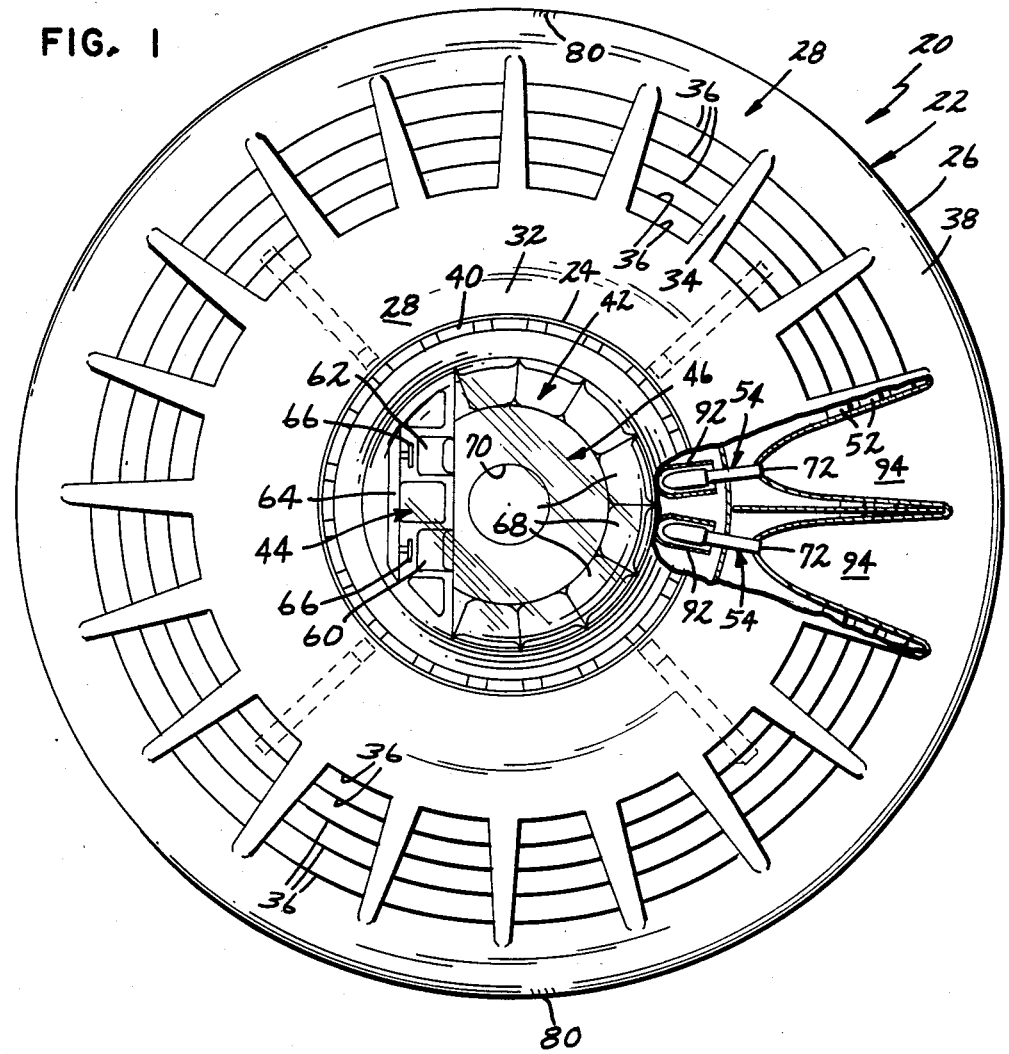
FIG. 1 is a top plan view of a craft in accordance with the present invention, some portions thereof being broken away.
Figure 2:
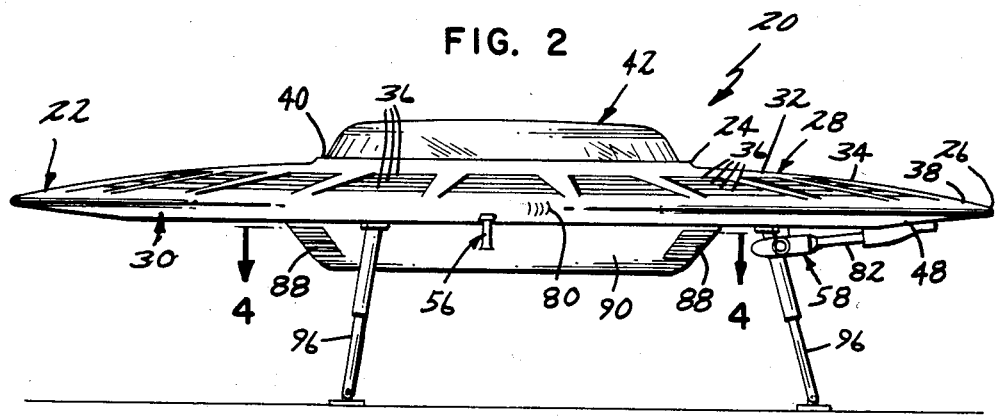
FIG. 2 is a side elevational view of the craft of FIG. 1.
Figure 3:
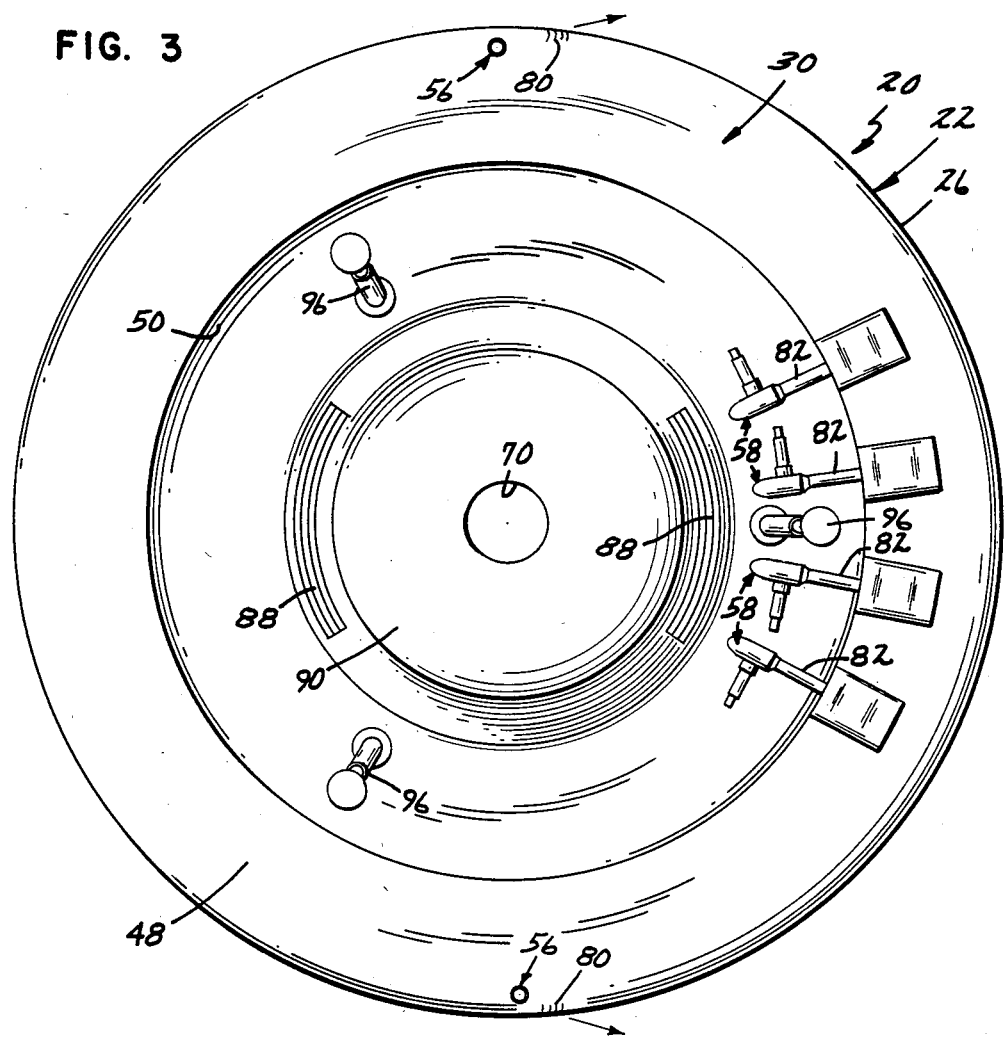
FIG. 3 is a bottom plan view of the craft.
Figure 4:
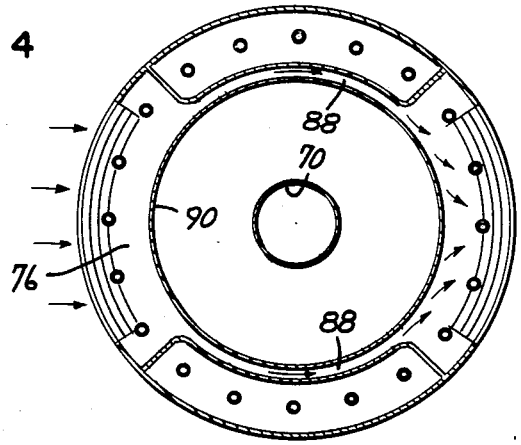
FIG. 4 is a view taken generally along the line 4—4 of FIG. 2.

Referring now to the drawings wherein like reference numerals denote like elements throughout the several views, FIG. 2 illustrates a heavier-than-air flying apparatus 20 in accordance with the invention of the present application as such a structure would appear when landed. The craft 20 illustrated includes an airfoil 22 which, as seen in FIG. 1, can be generally circular in configuration. It will be understood, however, that such a manner of shaping the airfoil 22 is not exclusive.

Figure 7:
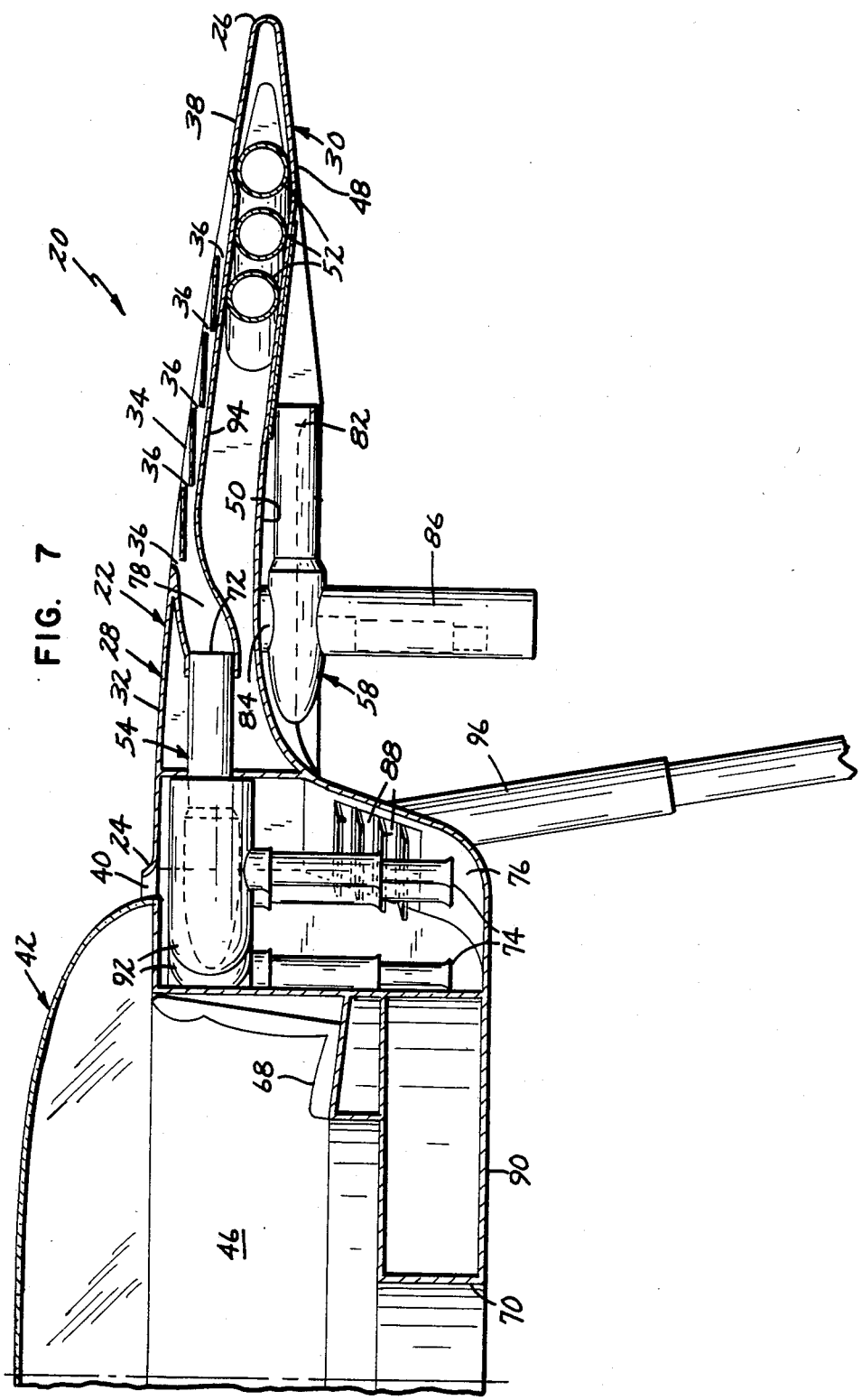
FIG. 7 is a view similar to FIG. 4 illustrating an alternative structure for the airfoil and dispositions of the forward flight auxiliary engines.

The airfoil 22 illustrated is generally annular in shape having radially inward and outward peripheral edges 24, 26. As best seen in FIGS. 5 and 7, the airfoil 22 includes an upper wall 28 and a lower wall 30, each extending radially between the inward and outward peripheral edges 24, 26.

The upper wall 28 can be curvilinear in configuration. That is, it can have both curved and linearly extending portions. As best seen in FIGS. 5 and 7, the upper wall 28, as it extends outwardly, has, extending sequentially in an outward direction, an annular curved portion 32, an intermediate annular, linearly configured portion 34 having apertures, shown as louvers 36 formed therein, and an outermost, annular, curved portion 38.

The airfoil 22 has a central aperture 40 formed therein. A cabin 42 comprising operator and passenger compartments 44, 46 can be held within this aperture 40. The linearly configured annular portion 34 which has louvers 36 formed therein can be concentric with respect to the aperture 40 and cabin 42 held therein.

As best seen in FIGS. 5 and 7, the louvers 36 formed in the linearly configured portion 34 of the upper wall 28 of the airfoil 22 can vent outwardly across an upwardly facing surface of the upper wall 28. Such a louver configuration is for a purpose to be discussed hereinafter.

The lower wall 30 of the airfoil 22 converges with the upper wall 28 at the outer peripheral edge 26 of the airfoil 22. The lower wall 30 includes a downwardly facing surface 48, and this surface 48, as seen in FIG. 5, can have formed therein a radially inwardly disposed annular recess 50. This recess 50 has the primary function of reducing aerodynamic drag.

FIGS. 5 and 7 illustrate embodiments of the flying craft 20 which have two and three, respectively, toroidal fuel tanks 52. It should be understood that the exact number of fuel tanks 52 provided is a function of the specific size of the airfoil 22 utilized in a particular case, the number of engines 54, 56, 58 powering the craft 20, and the desired range of the craft 20.

The fuel tanks 52 carry fuel which supplies not only main engines 54, but, in certain preferred structures, also engines 56 for use in controlling yawing motion of the craft 20 and forward flight auxiliary engines 58. Since the main engines 54, as will be discussed hereinafter, can be disposed radially, extending outwardly from the cabin 42, the tanks 52 can be baffled in order to limit the size of the free surface of fuel within the tanks 52 to increase stability.

As seen in the applicable figures, each tank 52 is shown as being circular in cross section. It will be understood that other shapes of cross section can function equally as well however.

As best seen in FIG. 1, the cabin 42, as is the airfoil 22 proper, is, as seen in top plan, disposed generally symmetrically about a fore-and-aft axis of the craft 20 with respect to a direction of intended movement thereof. The cabin 42 includes a portion 44 in which are positioned pilot and copilot seats 60, 62. The operator portion 44 of the cabin 42 further includes a control panel 64 and controls 66 for effecting modulation of the various engines 54, 56, 58 to accomplish the desired movement.

An after portion 46 of the cabin 42 can include seating 68 for passengers. Eight passenger seats 68 are illustrated in FIG. 1, although seating may be provided for any number of passengers depending upon the size of the craft 20. The cabin 42 has a lower access hatch 70 to provide ingress to and egress from the craft 20.

The main engines 54 function as means for directing fluid flow through the apertures 36 formed in the upper wall 28 of the airfoil 22 and over portions of the upwardly facing surface of that wall 28. Although not an exclusive number, it has been found appropriate to provide twenty of these engines 54 so that exhaust ducts 72 thereof extend radially about the cabin 42 at equal angles of approximately 18°. Air intakes 74 for these engines 54 are shown in the figures as extending generally vertically and as being disposed in a common annular chamber 76 extending around the cabin 42.

The main engines 54 are controlled from the operator portion 44 of the cabin 42 in such a manner so that movement over ground, vertical movement, and rotation of the craft 20 about three mutually perpendicular axes can thereby be effected. To illustrate, all the twenty main engines 54 can be throttled equally so that exhaust therefrom is directed through plenums 78, one communicating with each of the exhaust ducts 72 of the engines 54 and venting through the louvers 36. Depending upon the type of engine utilized for this purpose, the velocity of the exhaust can be too great to efficiently provide for reduced pressure on the upper surfaces of the airfoil 22. Consequently, the cross section of the plenums 78 can be greater than that of the corresponding exhaust ducts 72 of the engines 54. As the exhaust exits the ducts 72, therefore, it will be allowed to expand and, thereby diminish in velocity. It has been found that, by providing each plenum 78 with a cross sectional area approximately twice that of its corresponding exhaust duct 72, the velocity of the exhaust gasses will be reduced to a level at which it will efficiently accomplish the creation of a reduced pressure on the upper surfaces of the airfoil 22 in order to induce lift. Because of the shape of the airfoil 22 illustrated and the fact that the exhaust ducts 72 extend radially from the cabin 42, the plenums 78 can be given a flattened, angularly flared profile.

When sufficient lift is generated, and the craft 20 has risen to an altitude at which translational operation is desired, the operator of the craft 20 can modulate the engines 54 so that the forwardmost of the main engines 54 are throttled back or completely turned off. The aftermost engines will, thereby, provide thrust to move the craft 20 in a forward direction of intended movement. As the forward engines are down throttled, lift on the forward edges of the airfoil 22 will be decreased, thereby contributing to a negative pitching moment; that is, the craft 20 will tend to pivot nose downwardly. Structure can be provided to compensate for this effect in an appropriate manner. One appropriate structural arrangement will be discussed hereinafter.

As the craft 20 is moving in a forwardly direction, turns can be effected by throttling various engines on the craft 20. One method would reduce exhaust from engines on one side of the craft. The engines on the opposite side of the craft will not only urge the vehicle into a turn, but they will also effect rolling motion to bank the craft as it enters the turn.

Means can be provided to further facilitate coordinated turns by inducing yaw of the craft about an axis normal to a plane defined by the airfoil 22. Engines can be provided at the radially outward peripheral edge 26 of the airfoil 22 for this purpose. In a preferred embodiment, two sets of engines 56 can be positioned at lateral locations on the periphery of the airfoil 22 and at diametrically opposed stations. Each set of engines 56 can have an exhaust duct facing in a circumferential direction generally opposite that of the other corresponding engine. Depending upon the desired direction in which yawing is sought to be accomplished, either one or another of each pair of engines can be activated to exhaust through a louver grillwork 80. It will be understood that, although two pairs of yawing augmentation engines have been discussed herein, a single engine, capable of directing exhaust in opposite directions, can be used for this purpose.

As previously discussed, as the main engines 54 are modulated in order to make the transition from vertical lift to forward flight, a negative pitching moment will tend to occur. One manner in which this can be compensated for is by providing a number of auxiliary engines 58 to augment forward flight. As seen in the figures, these auxiliary engines 58 can be mounted to the lower wall 30 of the airfoil 22 and substantially recessed in the concavity 50 formed in the downwardly facing surface thereof so that exhaust from these engines 58 will be directed along the downwardly facing surface. The engines 58 can, however, be positioned at a slight angle to a plane defined by the airfoil 22 in order to provide a force component normal to the plane. They can, thereby, effect a positive pitching moment to counteract the negative pitching moment which is developed during the transition.

These auxiliary engines 58 can, additionally, serve other functions. Because of their positioning substantially parallel to the plane of the airfoil 22 and the direction of their exhaust generally rearwardly, they can function to thrust the craft 20 in a forwardly direction.

Figure 8:
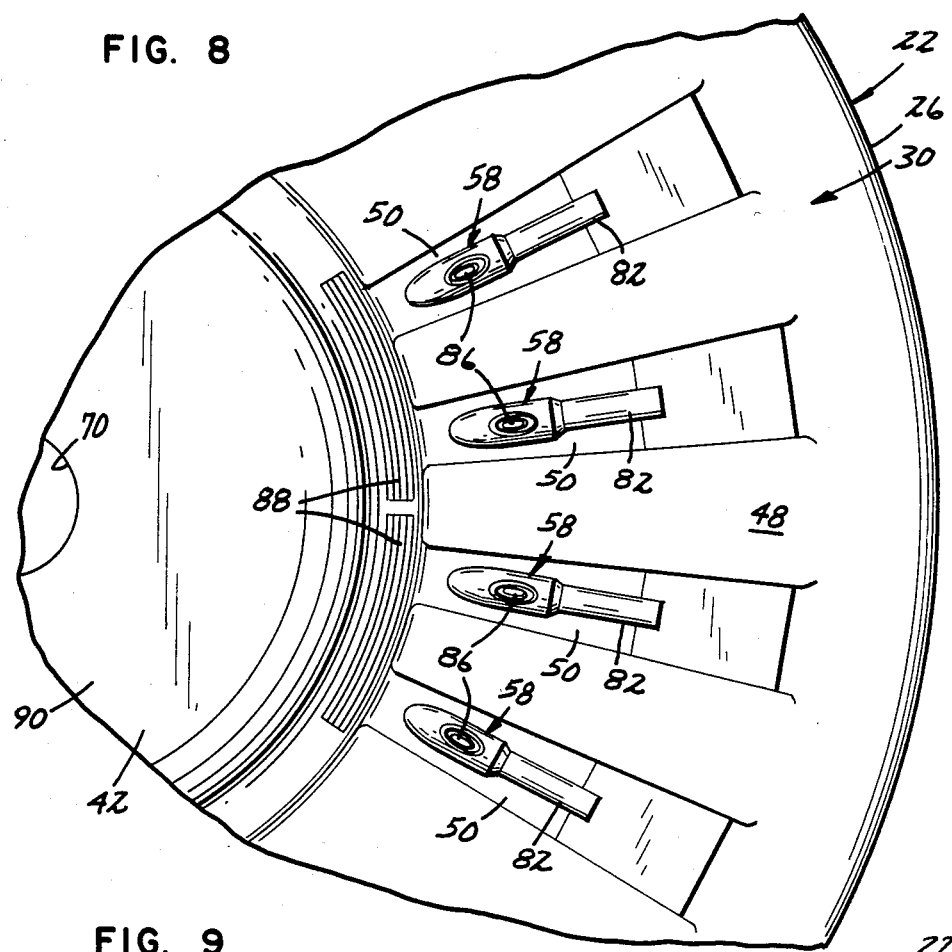
FIG. 8 is an enlarged bottom plan view showing orientations of the forward flight auxiliary engines as seen in FIG. 3.

FIG. 8 illustrates four radially disposed auxiliary engines 58. Two are positioned on either side of the fore-and-aft axis of the craft 20.

Figure 9:
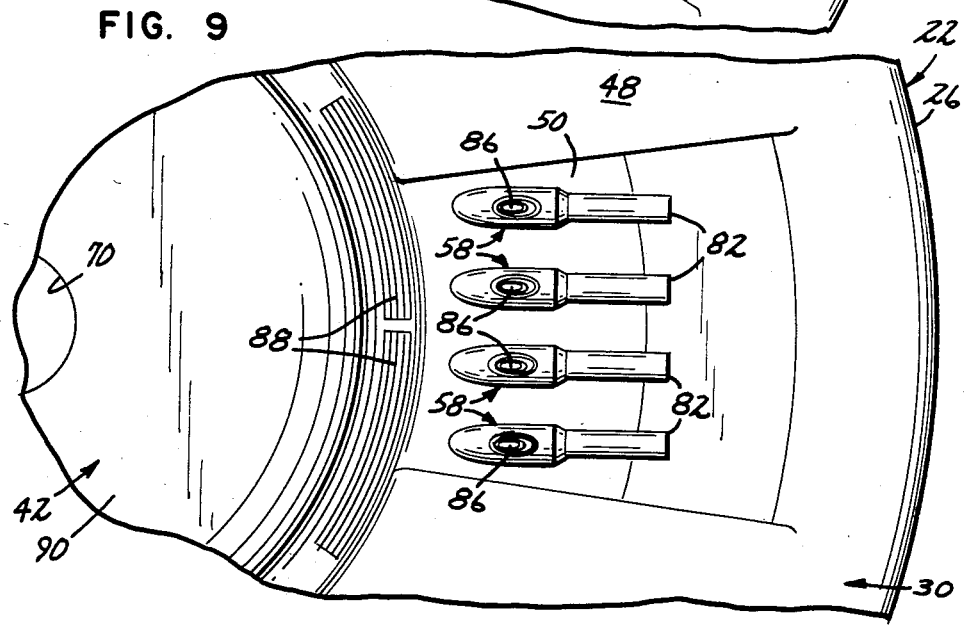
FIG. 9 is a view similar to FIG. 8 showing an alternative orientation for the forward flight auxiliary engines.

FIG. 9 show an alternative embodiment wherein the auxiliary engines 58 have exhaust ducts 82 extending generally parallel to one another. Again, two of the engines are positioned on either side of the fore and aft axis. With a configuration of this type, modulation of these auxiliary engines 58 can be used to augment yawing motion of the craft 20 because of the position and direction of exertion of force upon the craft. Essentially, because of the positioning of these engines 58, a moment arm exists through which the force is applied to the structure. In such an embodiment, special yawing motion control engines 56 might not be necessary.

Figure 10:
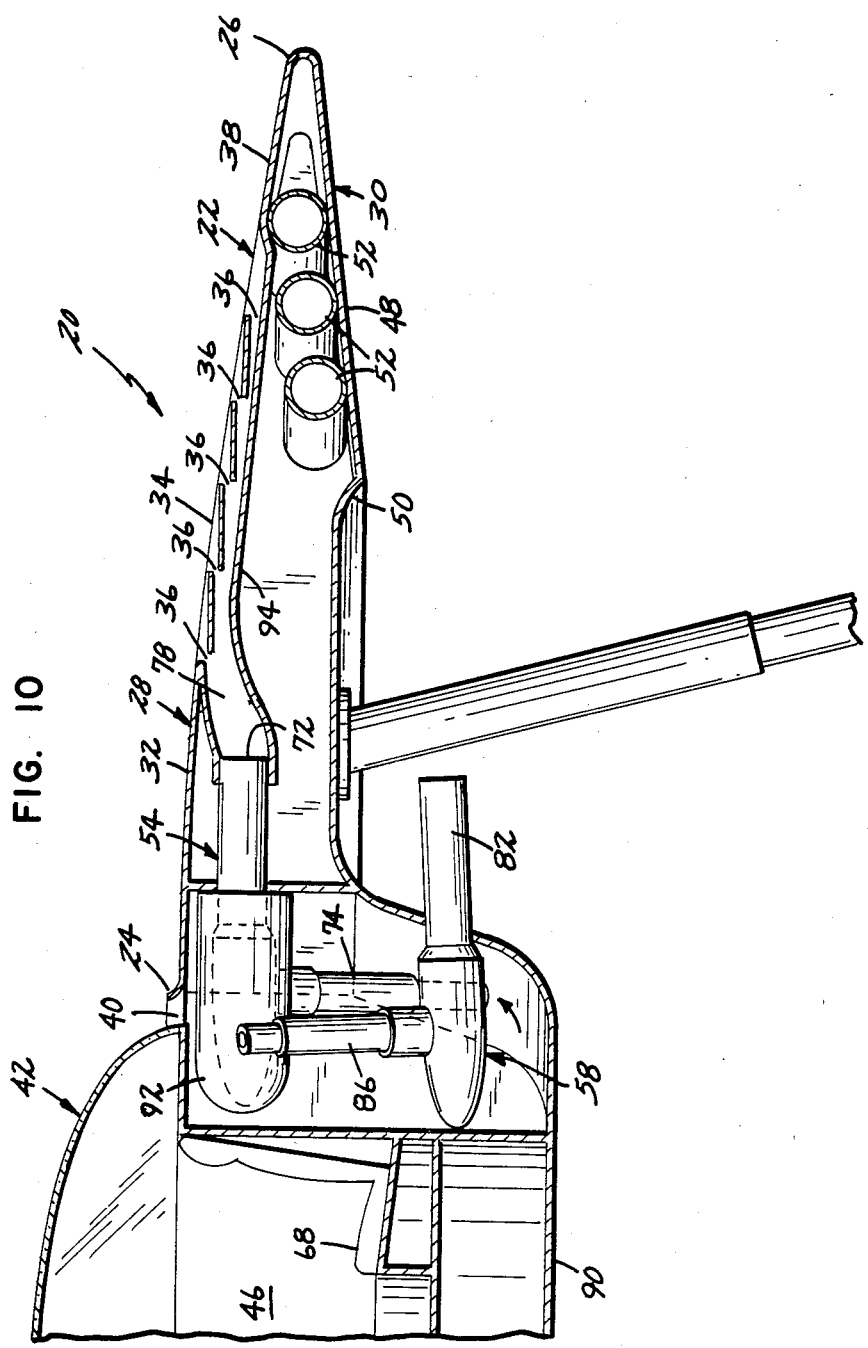
FIG. 10 is a view similar to FIG. 5 illustrating a second alternative structure for the airfoil and dispositions of the forward flight auxiliary engines.

As best seen in FIGS. 5 and 7, these auxiliary engines 58 can be mounted to the lower wall 30 of the airfoil 22 by mounting struts 84 and can be recessed to the greatest extent possible within the annular concavity 50 formed in the lower wall 30. The aerodynamic characteristics of the craft 20 can, thereby, be maximized. FIG. 10 illustrates an embodiment wherein the auxiliary engines 58 are substantially internal to the wall 90 of the cabin 42, enclosed within chamber 76 with only their exhaust ducts 82 protruding.

It has been found appropriate to use a propane powered pressure jet engine for each of the three applications of engines heretofore mentioned (that is, main engines 54, auxiliary forward thrust engines 58, and yawing motion control engines 56). When such an engine is used, liquid propane would be the fuel carried within the toroidal fuel tanks 52.

An engine invented by Eugene M. Gluhareff and manufactured by EMG Engineering Co. of Hesperia, Calif. has been found to be appropriate for use in this flying craft 20. Not only is this engine desirable because of the fact that it has no moving parts, but it also ecologically desirable. Its exhaust gas is non-toxic, consisting of steam, carbon dioxide, and nitrogen. It is capable of being throttled smoothly from idle to maximum thrust and back to idle. Additionally, it can be started readily even while air is being rammed into its exhaust duct 72. Possessing this feature, it is particularly desirable for use in the instant craft. When the craft 20 is to be transitioned from translational to vertical flight, the forwardly directed main engines 54 can, therefore, be started as their exhaust ducts 72 are being rammed by the air stream passing by the vehicle. As these forwardly disposed engines are brought up to speed, the craft 20 can be smoothly brought to a hover and landed if desired.

The EMG engine has a three stage combustion air intake 74. Each stage functions as a venturi to facilitate and induce flow of air and vaporized propane to a combustion chamber of the engine. Maximum efficiency is, thereby, obtained.

During forward flight of the craft 20, maximization of the efficiency of the main operating engines 54 and the auxiliary forward thrust engines 58 can be accomplished by directing portions of the air stream passing along the craft into the air intakes of the engines 74, 86. As can be seen in FIGS. 5 and 7, the air intakes 74 of the main engines are disposed within a common chamber 76 encircling the cabin 42. As the craft 20 is moving forwardly with its forwardly positioned main engines 54 turned off, air can pass inwardly through the forward louvers 36 and into the exhaust ducts 72 of the engines, downwardly through the air intakes 74 and into the common chamber 76, along the sides of the cabin 42, and be rammed into the air intakes 74 of the operating main engines 54.

In order to ram additional air into the intakes 86 of the auxiliary engines 58, a passage 88 can be provided through a peripheral wall 90 of the cabin 42 to channel more air therethrough to a location proximate the intakes 86 to those engines 58. A ram air effect can, thereby, be facilitated.

Engines of the type described can attain relatively high temperatures during operation. It is, therefore, desirable to insulate both the cabin 42 and the fuel tanks 52 from these high temperatures. Heat shields 92, 94 can be provided to accomplish this insulation. Heat shields 92, 94 bound an area in which thermal energy can be contained. Energy held within this area can be used to power auxiliary power units for running avionics, lights, computers, etc. (not shown). A heat exchange means may be used to conveniently transfer entrapped heat surrounding the engine to appropriate conversion or transfer equipment, which would in turn provide auxiliary power and required heating for the aircraft.

As seen in FIG. 2, strut support means 96 can be provided to support the craft 20 when it is on the ground. Optimally, the struts 96 are retractable in order to maximize the aerodynamic profile of the craft 20 during flight. The figures illustrate three supporting struts 96 although any number might be used to support the craft 20.

The struts 96 can carry means for ascertaining the weight distribution of the craft 20 when it is loaded. This is a particularly desirable feature since weight distribution will vary when passengers are seated within the cabin 42. Once the center of gravity of the craft 20 is located, its location can be selectively positioned by moving weights or fluids (not shown) provided for that purpose. In one such arrangement, weights might be mounted to one of three angularly spaced worm gears (not shown) mounted radially beneath the floor of the cabin 42. Rotation of the worm gear would adjust the weight dimension along the axis of the gear.

As can be seen, the present invention provides a new, unique, and significant improvement over the prior art. It provides a structure used in heavier-than-air flight which has no moving parts in the external air stream during powered flight or in the propulsion system. All functions of the craft 20 can be controlled from the operator portion 44 of the cabin 42 by means including servo valves with feedback loops and synchronous electronic stabilization. For optimum control, a computer backup system can be provided. A servo system having a manual override control input system can also be provided as an alternative.

Numerous characteristics and advantages of the invention and its preferred embodiments have been set forth in the foregoing description. It will be understood, of course, that this disclosure is, in many respects, only illustrative. Changes can be made in details, particularly in matters of shape, size, and arrangement of parts without exceeding the scope of the invention. The invention's scope is defined by the language in which the appended claims are expressed.

What is claimed is:

1. A heavier-than-air flying craft, comprising:
    (a) a cabin;
    (b) a single annular airfoil having a central aperture formed therein, said cabin being disposed within said aperture and secured to said airfoil, said airfoil including a curvilinear upper wall defining an annular portion, concentric relative to said aperture, having a multiplicity of radially outwardly venting louvers formed therein;

(c) a plurality of main engines spaced angularly about said cabin, controllable from said cabin, each including a radially extending exhaust duct disposed beneath said airfoil wall to direct exhaust generated by said engines radially outwardly, through said louvers, and over an upwardly facing surface of said wall, wherein each of said engines includes component elements fixed relative to one another to define an airfoil-engine assembly having no moving parts;

(d) wherein flight of the craft is accomplished without movement of any component in the external air stream when the craft is in powered flight;

(e) means for controlling yawing motion;

(f) wherein said airfoil further includes a lower annular wall converging with said upper wall proximate a peripheral edge thereof and wherein said yawing motion control means comprises a pair of engines controllable from said cabin and mounted between said upper and lower walls, each mounted proximate the periphery of said airfoil and having an exhaust duct directed in an opposite circumferential direction from that in which the exhaust duct of the other of said yaw control engines is directed;

(g) forward flight auxiliary propulsion means;

(h) wherein said forward flight auxiliary propulsion means comprises a plurality of auxiliary engines suspended from said lower wall, each of said auxiliary engines being controllable from said cabin and including a radially and generally rearwardly extending exhaust duct; and (i) wherein said lower wall has a radially inwardly disposed annular recess formed within, and wherein said auxiliary engines are mounted within said recess with said exhaust ducts of said auxiliary engines disposed to direct exhaust rearwardly therefrom immediately below a lower surface of said lower wall.

2. A craft in accordance with claim 1 wherein said main engines are positioned within said airfoil, beneath said upper wall and radially inwardly from said annular portion having said louvers formed therein.

3. A craft in accordance with claim 2 wherein said exhaust ducts of said main engines are uniformly spaced about said airfoil at equal angles relative to adjacent of said ducts.

4. A craft in accordance with claim 3 comprising 20 engines and wherein said exhaust ducts are spaced angularly at approximately 18° from adjacent of said ducts.

5. A craft in accordance with claim 1 further comprising a plurality of plenums, each communicating with one of said exhaust ducts and being disposed adjacent an angular section of said annular portion of said upper wall having said venting louvers formed therein to direct exhaust generated by an engine communicating with a particular plenum through said louvers and radially outwardly over said upwardly facing surface.

6. A craft in accordance with claim 5 wherein each of said plenums has an angularly flaring and vertically flattened profile.

7. A craft in accordance with claim 5 wherein each of said plenums has a cross-sectional area, taken in a plane generally normal to a longitudinal axis of its corresponding exhaust duct and extending radially with respect to said airfoil, larger than the cross-sectional area of said corresponding exhaust duct, wherein the velocity of engine exhaust decreases as said exhaust expands when transiting from said duct to said plenum.

8. A craft in accordance with claim 7 wherein said plenum cross-section is approximately twice as large as said duct cross-section.

9. A craft in accordance with claim 1 wherein said yaw control engines are disposed diametrically opposite one another about said airfoil and at stations laterally with respect to an intended direction of motion of said craft.

10. A craft in accordance with claim 1 wherein each of said plurality of auxiliary engines is disposed angularly aligned with one of the rearwardly positioned of said main engines.

11. A craft in accordance with claim 10 comprising four auxiliary engines, two of said auxiliary engines being positioned on either side of a fore-and-aft axis of the craft.

12. A craft in accordance with claim 11 wherein said auxiliary engines each include an air intake and said cabin includes a peripheral wall, and wherein said cabin peripheral wall has formed therein air passage means extending from a forward portion thereof rearwardly along at least one side of said compartment to an area proximate said auxiliary engines, wherein a ram-air effect is achieved at said air intakes of said auxiliary engines as the craft moves forwardly driving air through said air passage means.

13. A craft in accordance with claim 12 wherein an air passage channel extends rearwardly along either side of said operator compartment.

14. A craft in accordance with claim 1 wherein said main, auxiliary, and yaw control engines burn propane.

15. A craft in accordance with claim 1 wherein said main, auxiliary and yaw control engines burn liquid fuel and further comprising at least one toroidal fuel tank enclosed within said airfoil between said upper and lower walls.

16. A craft in accordance with claim 15 wherein said at least one fuel tank is circular in cross-section.

17. A craft in accordance with claim 15 wherein said tank includes a plurality of baffles spaced at locations along said torus.

18. A craft in accordance with claim 15 further comprising heat shielding means for minimizing transfer of heat from said main, auxiliary, and yaw control engines to said at least one toroidal fuel tank enclosed within said airfoil.

19. A craft in accordance with claim 1 further comprising a heat shield insulating said cabin from heat generated by said main, auxiliary, and yaw control engines.

20. A craft in accordance with claim 1 wherein said cabin is defined by a wall having a compartment formed therein and wherein said forward flight auxiliary propulsion means comprises a plurality of auxiliary engines housed within said compartment, each of said auxiliary engines being controllable from said cabin and including a generally radially oriented exhaust duct extending rearwardly from said compartment.

21. A craft in accordance with claim 1 further comprising means for controlling rolling and pitching motion, and wherein said rolling and pitching motion control means comprises said plurality of main engines in combination with said airfoil.

22. A craft in accordance with claim 21 wherein said yawing motion control means and said rolling and pitching motion control means include no moving parts in the external air stream when the craft is in powered flight.

23. A craft in accordance with claim 22 wherein said yawing motion control means and said rolling and pitching motion control means comprise propane powered pulse jet engines having no moving parts.

24. A craft in accordance with claim 1 further comprising means for supporting the craft when it is on the ground.

25. A craft in accordance with claim 24 wherein said support means comprises a plurality of struts extending downwardly from one of said airfoil and said cabin.

26. A craft in accordance with claim 25 comprising three support struts spaced equi-angularly from one another about said cabin at 120°.

27. In combination with an annular airfoil having an upper wall defining therein an annular portion having a multiplicity of outwardly venting louvers; a plurality of radially extending, equi-angularly spaced engines disposed about the airfoil to direct exhaust through said louvers and over an upwardly facing surface of said wall, each of said engines having its air intake situated in a common chamber, and wherein, during movement of the combination structure in an intended direction of forward movement, engines forwardly disposed can be shut off and function as ram air ducts through which air can pass into said common chamber and to air intakes of operating engines said engines each comprising a three-stage combustion air intake, and wherein operation of said engines occurs without movement of component elements thereof.

* * * * *